(12) United States Patent
Dunn et al.

(10) Patent No.: US 10,043,541 B1
(45) Date of Patent: Aug. 7, 2018

(54) DISK DRIVE HEAD STACK ASSEMBLY HAVING HEIGHT-CONTROLLED SUSPENSION CIRCUIT TAIL TACK

(71) Applicant: Magnecomp Corporation, Murrieta, CA (US)

(72) Inventors: Christopher G. Dunn, Austin, TX (US); Benjapa Tanampee, Ayutthaya (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/350,036

(22) Filed: Nov. 12, 2016

Related U.S. Application Data

(60) Provisional application No. 62/266,603, filed on Dec. 12, 2015.

(51) Int. Cl.
*G11B 5/48* (2006.01)
(52) U.S. Cl.
CPC .......... *G11B 5/4853* (2013.01); *G11B 5/4826* (2013.01)
(58) Field of Classification Search
CPC .................... G11B 5/4853; G11B 5/4826
See application file for complete search history.

(56) References Cited

U.S. PATENT DOCUMENTS

| | | | | |
|---|---|---|---|---|
| 6,046,886 A | * | 4/2000 | Himes .................. | G11B 5/4846 360/234.5 |
| 6,754,045 B2 | * | 6/2004 | Korkowski ............ | G11B 5/486 360/245.9 |
| 8,276,256 B1 | * | 10/2012 | Zhang .................. | G11B 5/4833 29/603.03 |
| 8,325,446 B1 | * | 12/2012 | Liu ...................... | G11B 5/4833 360/245.9 |
| 8,476,153 B2 | | 7/2013 | Tezuka et al. | |
| 8,503,133 B2 | * | 8/2013 | Arai ..................... | G11B 5/4833 360/244.1 |
| 9,165,580 B2 | * | 10/2015 | Chen .................... | G11B 5/4853 |
| 9,190,086 B1 | | 11/2015 | Ee et al. | |
| 9,524,738 B1 | * | 12/2016 | Pan ........................ | G11B 5/48 |
| 9,530,439 B2 | * | 12/2016 | Chen .................... | G11B 5/1272 |
| 2005/0190503 A1 | * | 9/2005 | Maeda .................. | G11B 5/486 360/245.9 |
| 2010/0007993 A1 | * | 1/2010 | Contreras ............. | G11B 5/486 360/245.8 |

\* cited by examiner

*Primary Examiner* — Brian Miller
(74) *Attorney, Agent, or Firm* — Nixon Peabody LLP

(57) ABSTRACT

In a disk drive having a flexible circuit tail that is routed within a recess in the actuator arm, a dielectric spacer is added to the top of the tail in order to space the circuit traces within the tail further away from the electrically conductive actuator arm, and to make more repeatable that spacing. The added spacing reduces electrical coupling and thus increases the bandwidth of the circuit. The spacer can be in the form of a section of the same viscoelastic material that is used elsewhere as a vibration dampener on the suspension, the viscoelastic material being adhered to the tail before the tail is inserted within the recess. Alternatively, the spacer can be a thickened region of the flexible circuit covercoat in the area where the tail will reside within the recess.

22 Claims, 10 Drawing Sheets

DISK DRIVE HEAD STACK ASSEMBLY HAVING HEIGHT-CONTROLLED SUSPENSION CIRCUIT TAIL TACK

CROSS-REFERENCE TO RELATED APPLICATIONS

This application claims priority from U.S. Provisional Patent Application No. 62/266,603 filed Dec. 12, 2015, the disclosure of which is incorporated by reference as if set forth fully herein.

BACKGROUND OF THE INVENTION

1. Field of the Invention

This invention relates to the field of head stack assemblies of hard disk drives. More particularly, this invention relates to the field of a disk drive head stack assembly having a height-controlled suspension circuit tail tack.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 10 includes a spinning magnetic disk 12 containing a pattern of magnetic storage medium ones and zeroes on it that constitutes the data stored on the disk drive. The magnetic disk is driven by a drive motor (not shown). Disk drive unit 10 further includes a disk drive suspension 20 to which a head slider 34 (FIG. 2) is mounted proximate a distal end of load beam 24. The head slider contains magnetic read/write transducers, and thus constitutes a read/write head for writing data to, and reading data from, the data disk as the disk spins underneath the read/write head. The "proximal" end of a suspension or load beam is the end that is supported, i.e., the end nearest to base plate 22 (FIG. 2) which is swaged or otherwise mounted to an actuator arm 16. The "distal" end of a suspension or load beam is the end that is opposite the proximal end, i.e., the "distal" end is the cantilevered end.

Suspension 20 is coupled to actuator arm 16, which in turn is coupled to a voice coil motor 14 that moves the suspension 20 arcuately in order to position the head slider over the correct data track on data disk 12. Suspension 20 includes a suspension body portion, which normally comprises a base plate 22 and load beam 24. The head slider 34 is carried on a gimbal which is mounted to the suspension body. The gimbal allows the slider to pitch and roll freely so that it follows the proper data track on the disk, allowing for such variations as vibrations of the disk, inertial events such as bumping, and irregularities in the disk's surface. As shown, a vibration damper 25 of viscoelastic damper sheet material is attached to the load beam.

FIG. 2 is a top oblique partially exploded view of a prior art suspension 20 including a flexure 30, such as shown in U.S. Pat. No. 9,190,086 issued to Ee et al. and assigned to the present applicant. Suspension 20 includes a base plate 22 and a load beam 24, and a flexure 30 welded to the load beam. Suspension flexure 30 typically includes a metal support layer such as stainless steel, an insulating layer such as polyimide, and a signal conducting layer comprising copper or copper alloy, with individual copper traces defining individual signal traces that carry electrical control and data signals to and from head slider 34. The copper signal traces are typically covered and protected over most of their lengths by an electrically insulating covercoat or coverlayer, which is typically polyimide. The portion of flexure 30 that carries the signals defines a flexible circuit that is sometimes called the suspension circuit 40. The suspension circuit 40 typically includes a portion which extends proximal of the suspension body, called the circuit tail 41 or suspension flexure tail, or simply the tail.

FIG. 3 is an oblique top view of a typical prior art head stack assembly (HSA) 80 containing a number of separate actuator arms 16 and corresponding suspensions 20 including circuit tails 41. During manufacture of the Head Stack Assembly (HSA), manufactures typically tack the suspension flexure tail 41 in a slot or recess in the corresponding actuator arm 16 in order to prevent tail 41 from fluttering during drive operation due to the effects of wind on the tail. The recess extends generally longitudinally along the side of the actuator arm 16. This tacking process is typically performed by manufactures using a UV-curable adhesive. Area A, indicated by a circle in the figure, is the area in which circuit tail 41 enters or partially enters the slot in the side of actuator arm 16. Typically half the width of circuit tail 41 is inserted into the slot in actuator arm 16, causing either the read or write signal trace pair to be located within the gap. Thus, the flexible circuit tail 41 is at least partially secured within the slot, and is therefore at least partially shielded from the disk wind. To ease the HSA assembly process, the arm gap is typically much larger than the total thickness of the flexure tail which is typically 30 to 45 μm thick.

SUMMARY OF THE INVENTION

The current tail tack assembly method has worked well for many years in the disk drive industry, but as data rates continue to increase an improved assembly method is needed to better control the location of the suspension tail in the arm gap.

FIG. 4 is a sectional view of an actuator arm 16 including tail portion 41 according to the prior art. Arm gap, slot, or recess 18 is defined by a space between actuator arm upper wall 17 and actuator arm lower wall 19. A suspension tail 41 of circuit 40 is partially inserted in slot 18. Tail portion 41 of circuit 40 includes a metal support layer 42 which is typically stainless steel, a dielectric insulating layer 44 which is typically polyimide, copper signal traces 46 including copper signal traces 47 which are within gap 18, and a protective covercoat 48 which is typically polyimide. For purposes of discussion, signal trace pair 47 within gap 18 will be presumed to be the write signal trace pair. A typical prior art assembly method has been to use a tack adhesive 52 above and a tack adhesive 54 below tail 41 to help keep it within slot 18.

A shortcoming of the structure and assembly method of the prior art is that they do not control the vertical location of the tail 41 within arm gap 18. FIGS. 5A-5C are sectional views according to the prior art showing how the tail 41 location can vary from the top to the bottom of the gap 18 using prior art assembly methods.

Controlling trace impedance has become critical to new hard disk drive designs to achieve writer bandwidths that are 4 GHz or higher. The current tail tack process does not control the location of the tail 41 in arm gap 18; consequently, there is significant variation in the distance between the write signal traces 47 and the upper arm 17. If tail 41 is located near the top wall of the arm gap 18 as illustrated in FIG. 5A, then the write signal traces 47 can be very near upper arm 17, such as approximately 5 μm. This will lead to high electrical coupling of the write trace pair 47 to upper arm 17, versus the circuit tail 41 being located near the bottom of the arm gap 18 where the traces 47 are spaced over 25 μm from the arm 17 such as illustrated in FIG. 5C. This variability creates a large amount of variation in the electrical impedance of the circuit leading to large amount of bandwidth variation.

The graphs of FIGS. 8-11 show electrical simulations of a suspension design with tail 41 located at different points vertically within the arm recess 18 and the resulting impact on bandwidth. Locating tail 41 too close to the top wall 17 of arm gap 18 will cause the impedance to rise significantly and hence cause the bandwidth to drop significantly. In the worst case, the circuit bandwidth falls below 1 GHz.

The invention ensures at least a minimal spacing between the circuit traces that are disposed within the recess in the actuator arm, and the electrically conductive top wall of the actuator arm that forms the recess, in order to minimize electrical coupling and hence maintain a high signal bandwidth.

According to a first embodiment, a thin shim or spacer of dielectric material is added over the portion of the suspension circuit tail that gets inserted into the slot in the actuator arm. The spacer ensures a minimum separation distance between the circuit traces and the conductive upper wall of the slot, thus ensuring good bandwidth performance. That separation distance is greater than the specified nominal thickness of the covercoat of the circuit, including the nominal covercoat thickness over the traces within the slot. The spacer can be made of the same viscoelastic dampener sheet material from which suspension vibration dampers are commonly made, with advantages that the dampener sheet material is usually of controlled thickness, has a peel-off adhesive already on it, and the automated machinery that makes the suspension including applying the standard suspension vibration dampener can be easily modified to include placing the spacer on circuit tail 41.

In a second embodiment the spacer takes the form of a thickened portion of the covercoat over the signal traces within the recess, such that the covercoat is thicker or thickest over the circuit traces in the tail area that gets inserted into the actuator arm recess. The thickened portion keeps the circuit traces a minimum distance away from the conductive top wall of the actuator arm recess.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
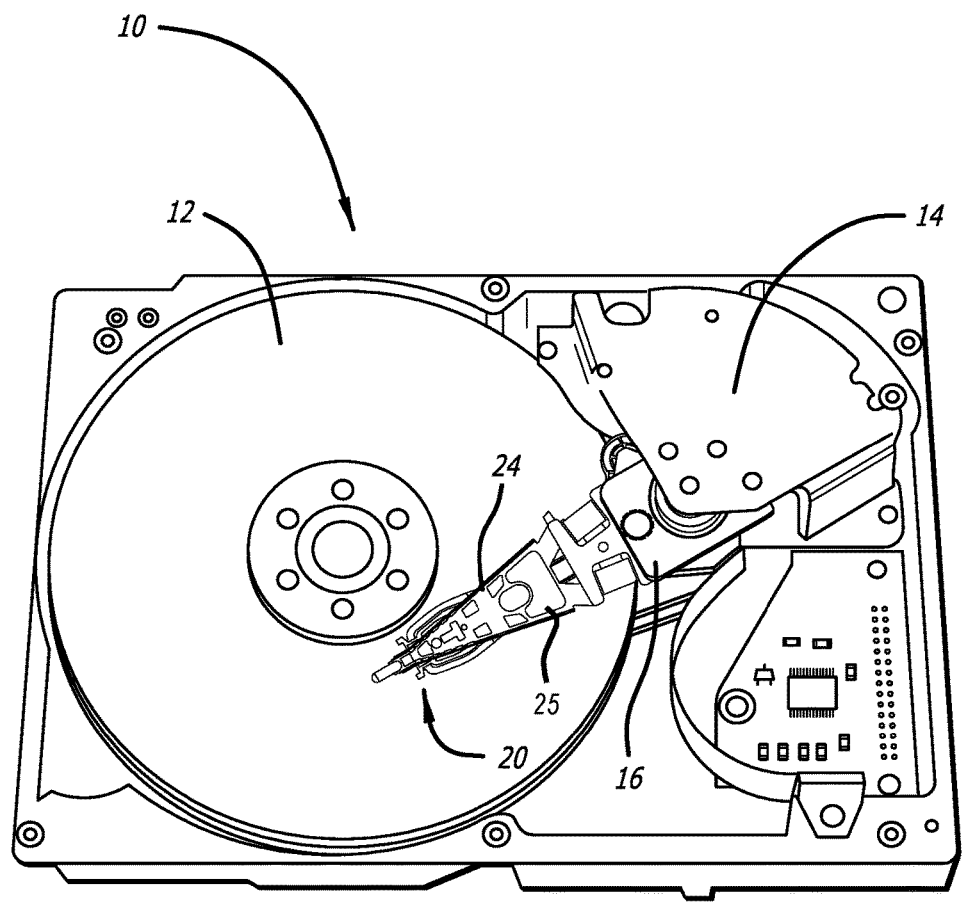
FIG. 1 is an oblique view of a prior art disk drive.
Figure 2:
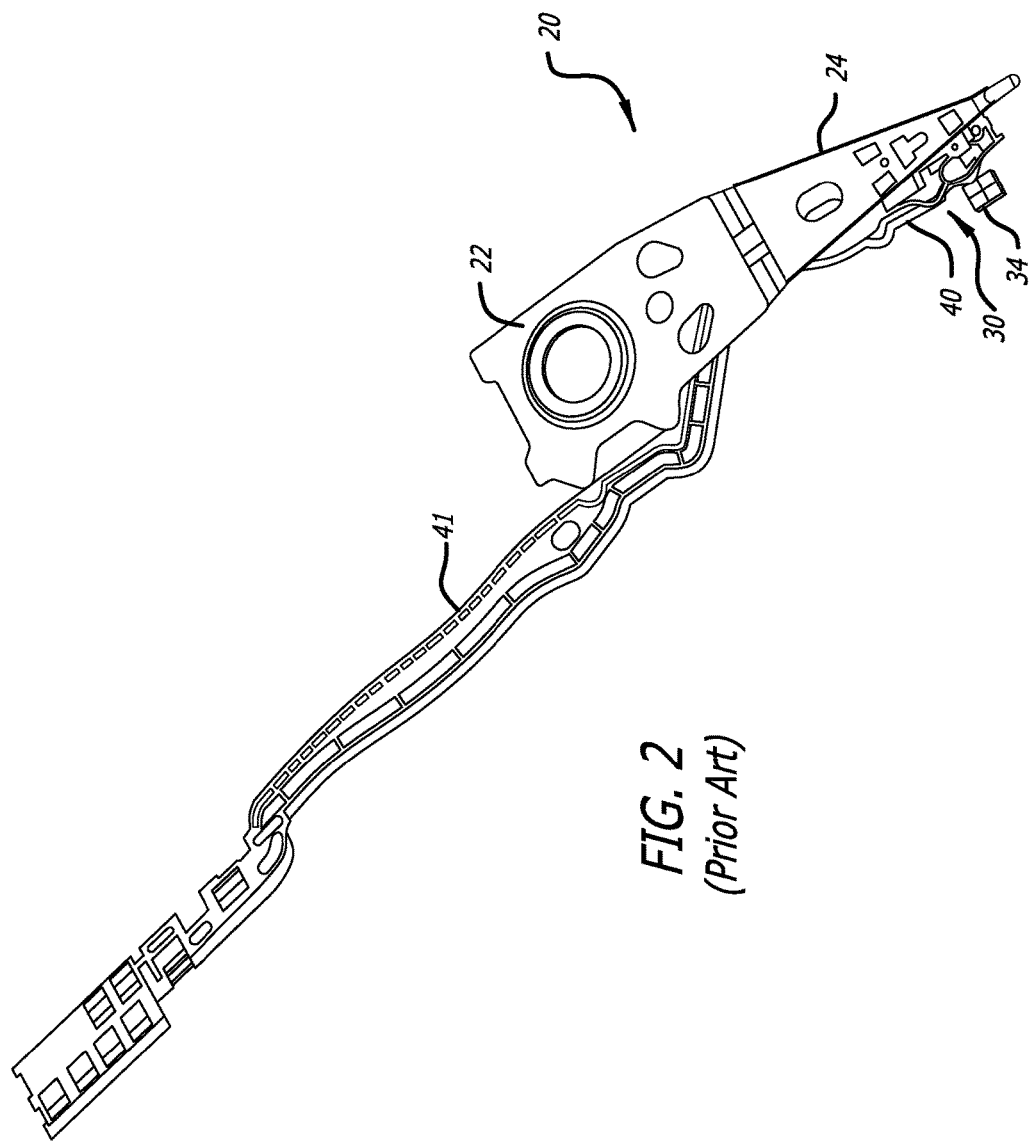
FIG. 2 is an oblique top partially exploded view of a prior art suspension including a flexure.
Figure 3:
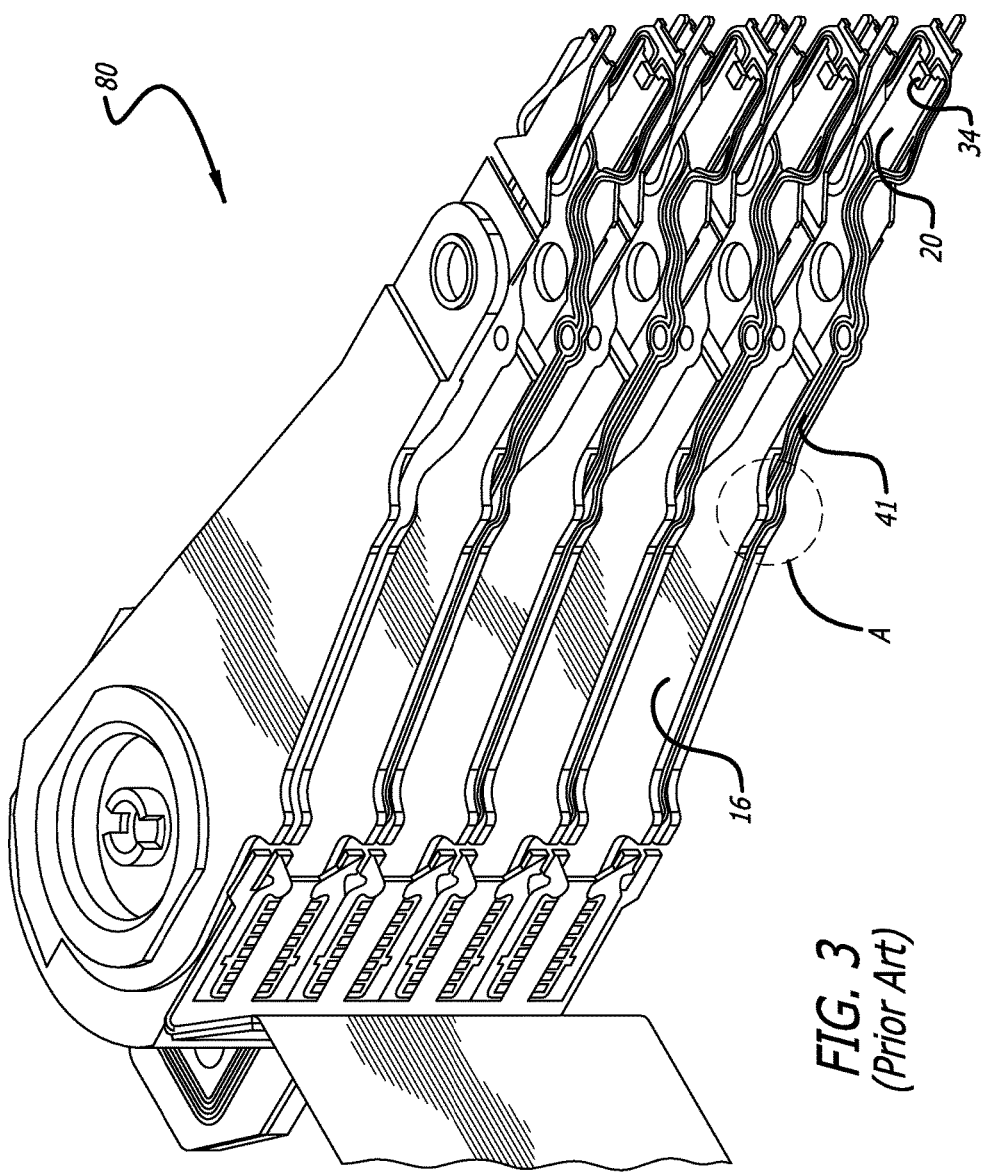
FIG. 3 is an oblique bottom view of a prior art head stack assembly.
Figure 4:
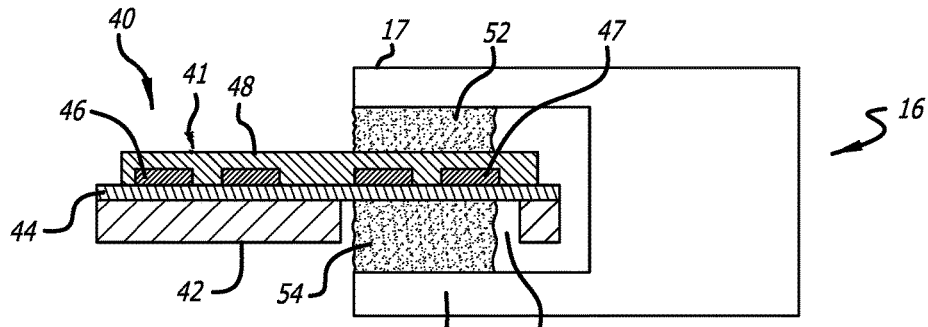
FIG. 4 is a cross-section of a prior art suspension circuit tail area partially within a slot in the actuator arm.
Figure 5A:
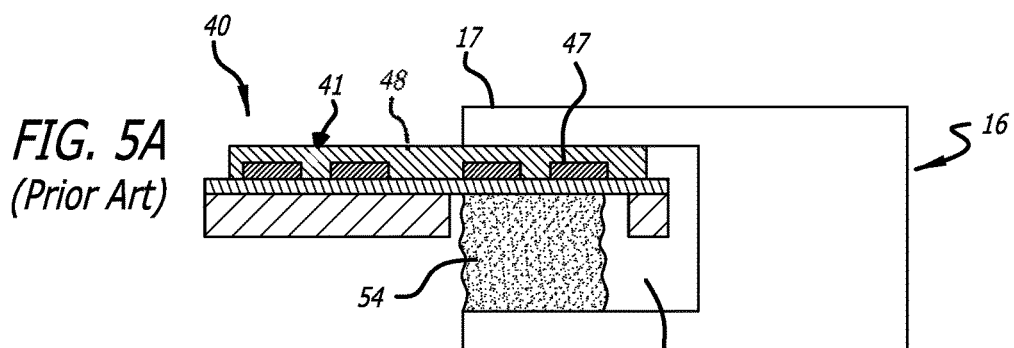
FIGS. 5A-5C are cross-sections of a prior art suspension circuit tail area partially within a slot in the actuator arm, showing possible variations in the height of the circuit tail within the slot.
Figure 5B:
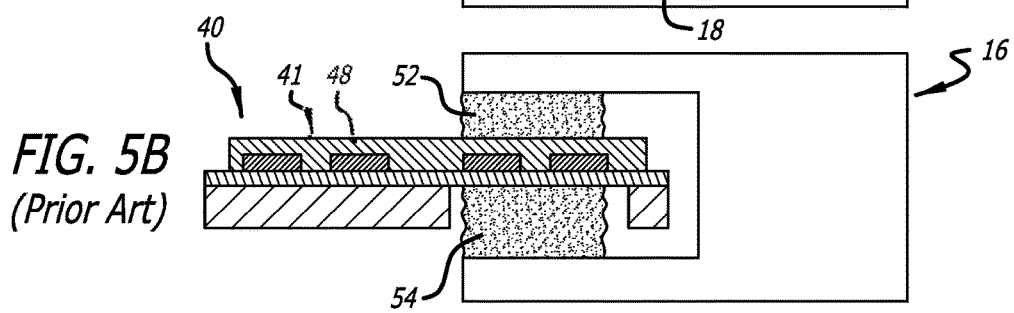
Figure 5C:
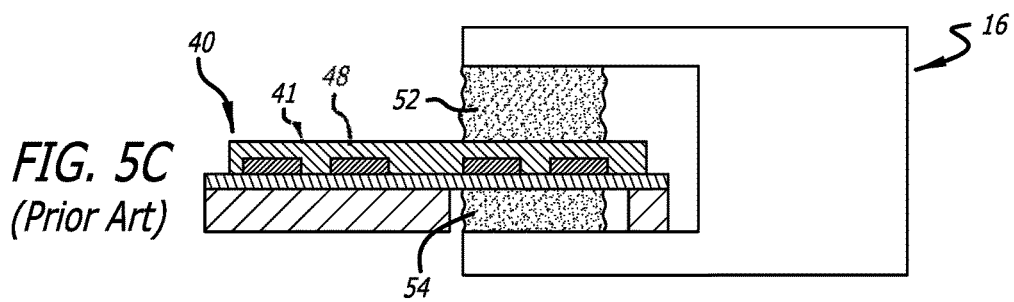
Figure 6A:
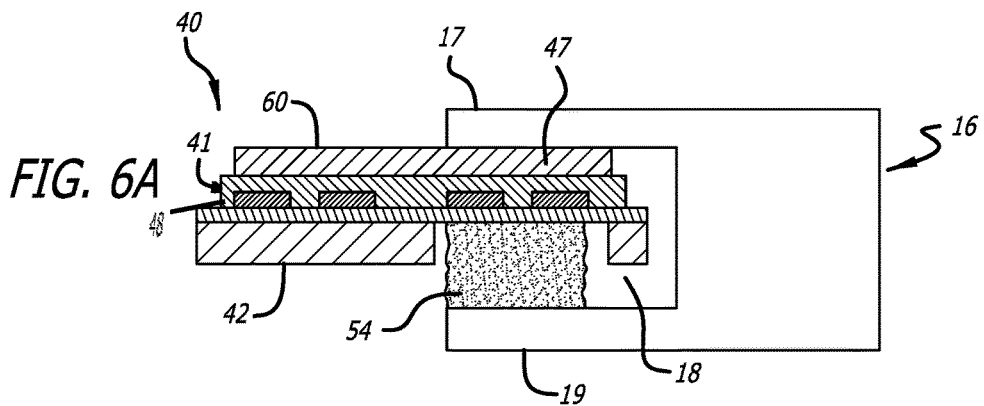
FIGS. 6A-6C are cross-sections of a circuit tail area partially within the slot in the actuator arm according to a first embodiment of the invention, showing possible variations in the height of the circuit tail within the slot.
Figure 6B:
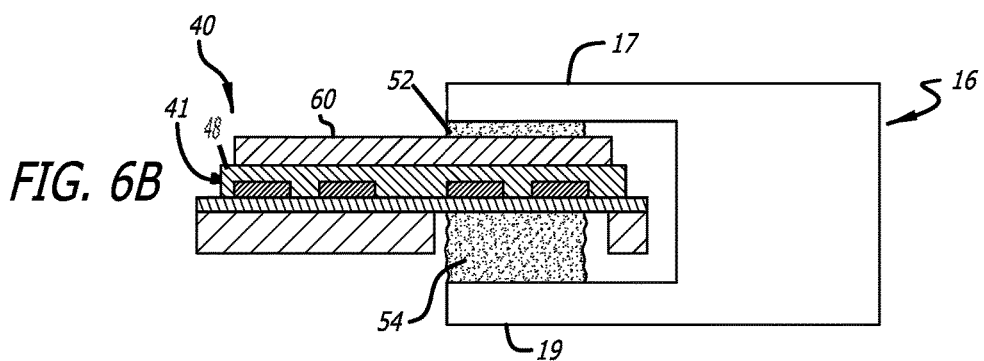
Figure 6C:
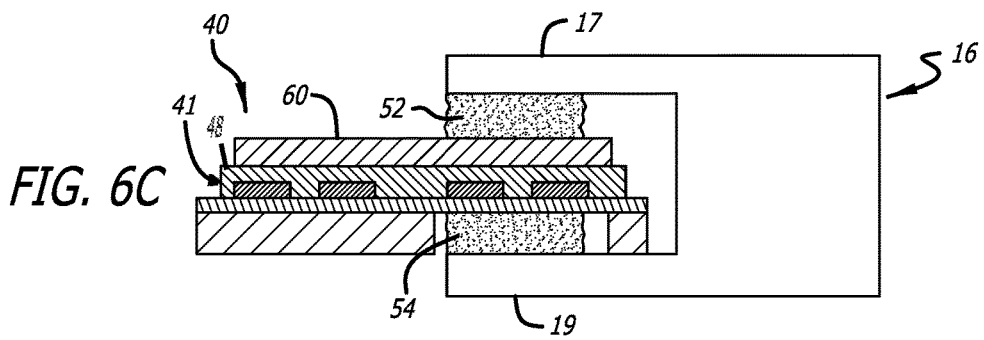

FIGS. 6A-6C are cross-sections of a circuit tail area 41 of circuit 40 partially within the slot 18 in the actuator arm 16 according to a first embodiment of the invention, showing possible variations in the height of the circuit tail within the slot. In this embodiment a dielectric spacer or shim 60 is added to the top of tail 41 over signal traces 47 to ensure the desired separation between the signal traces and the electrically conductive, and hence electrically dissipative, actuator arm upper wall 17. Tail 41 is then inserted into 18 in the actuator arm 16 as normal. The spacer 60 on the top of the tail ensures at least a minimum spacing between the circuit traces 47 and the adjacent conductive top wall 17 of actuator arm slot 18. That spacing will be at least the width of the usual insulating covercoat 48 over the traces plus the thickness of spacer 60. Preferably shim 60 ensures a separation distance of at least 0.5 mm from circuit traces 47 to a nearest conductive wall of actuator arm 16 in order to maintain high bandwidth.

Spacer 60 can be made of the same viscoelastic dampener sheet material from which the suspension vibration dampers are commonly made, with advantages that the dampener sheet material is usually of controlled thickness, has adhesive and a peel-off release liner already on it, and the automated machinery that makes the suspension including the standard suspension vibration dampener can be easily modified to include placing spacer 60 on circuit tail 41. Thus, spacer 60 can be adhered in solid form to circuit tail 41 and in particular over circuit traces 47 after the circuit has been formed but before the tail 41 gets inserted into slot 18.

Shim thicknesses of 0.5 mm-3.0 mm are within the range that is expected to improve the bandwidth of the tail circuit. Viscoelastic dampener thickness of approximately 1 to 2 mm are commercially available and can be applied in the tail of the suspension. Suspension manufacturers have high volume manufacturing processes for removing the release liner from dampeners and applying dampeners on suspensions, so modification of these tools can be easily accomplished to develop a process to apply the dampeners to the tail to act as dielectric spacers.

Figure 7:
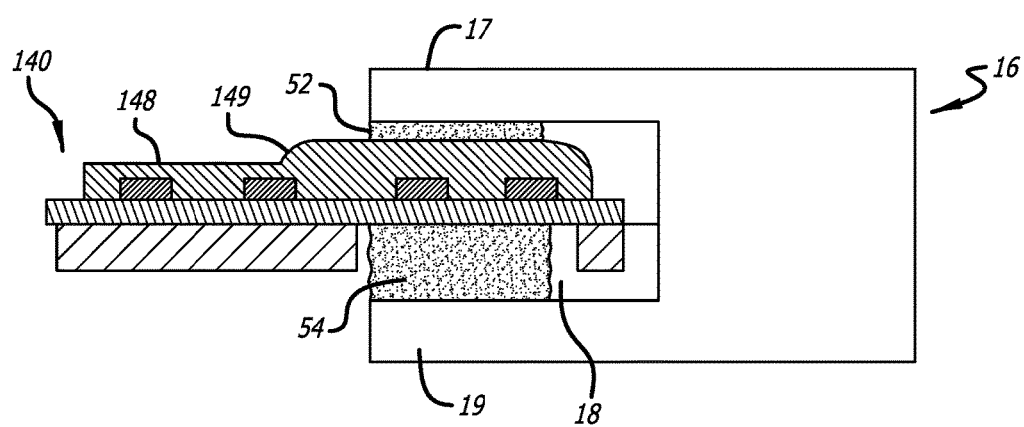
FIG. 7 is a cross-section of circuit tail area within the slot in the actuator arm according to a second embodiment of the invention.
Figure 8:
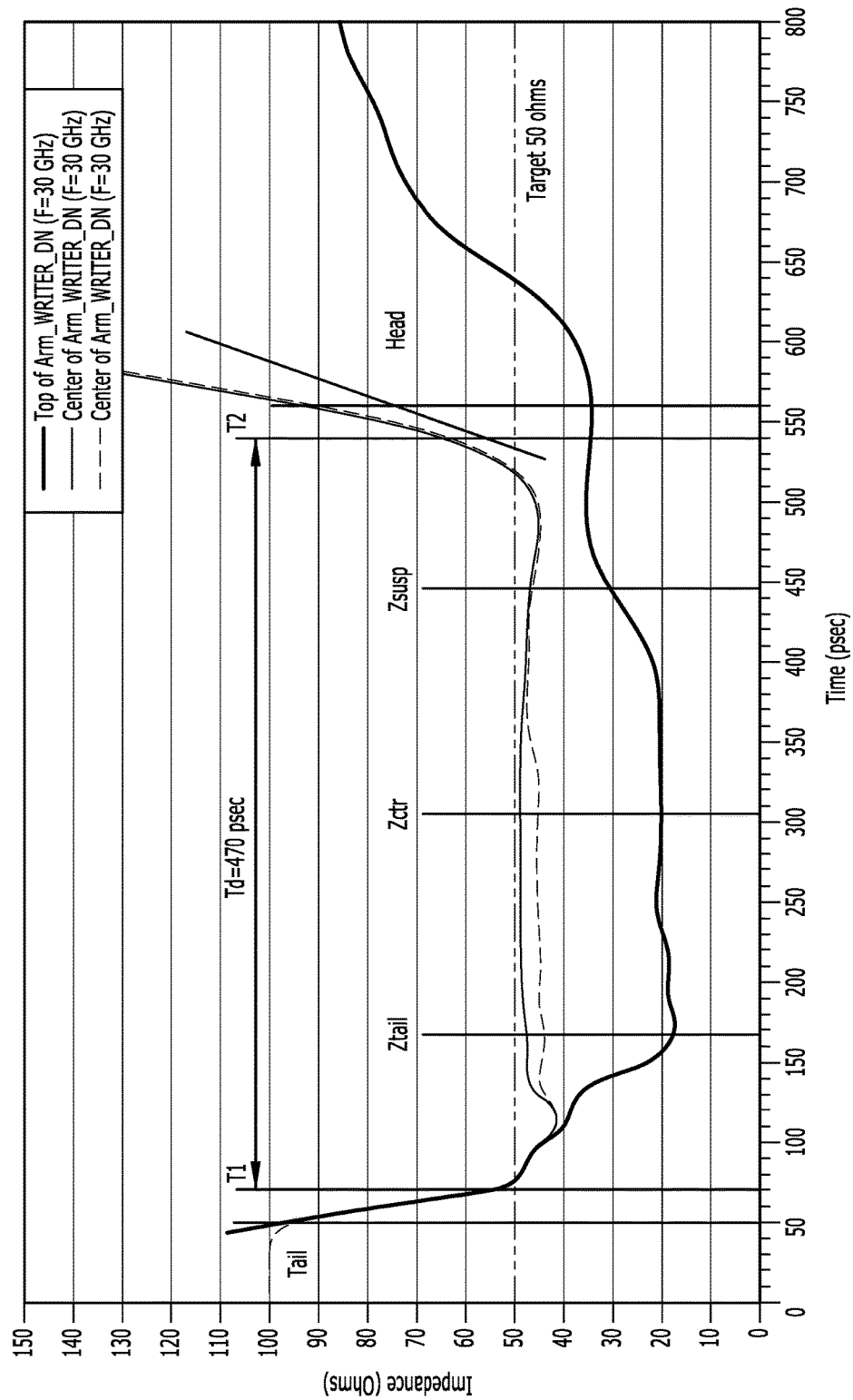
FIG. 8 is a graph showing time domain reflectometer (TDR) readings for data write signal traces for the tail being located at different heights within the actuator arm recess, according to a simulation.
Figure 9:
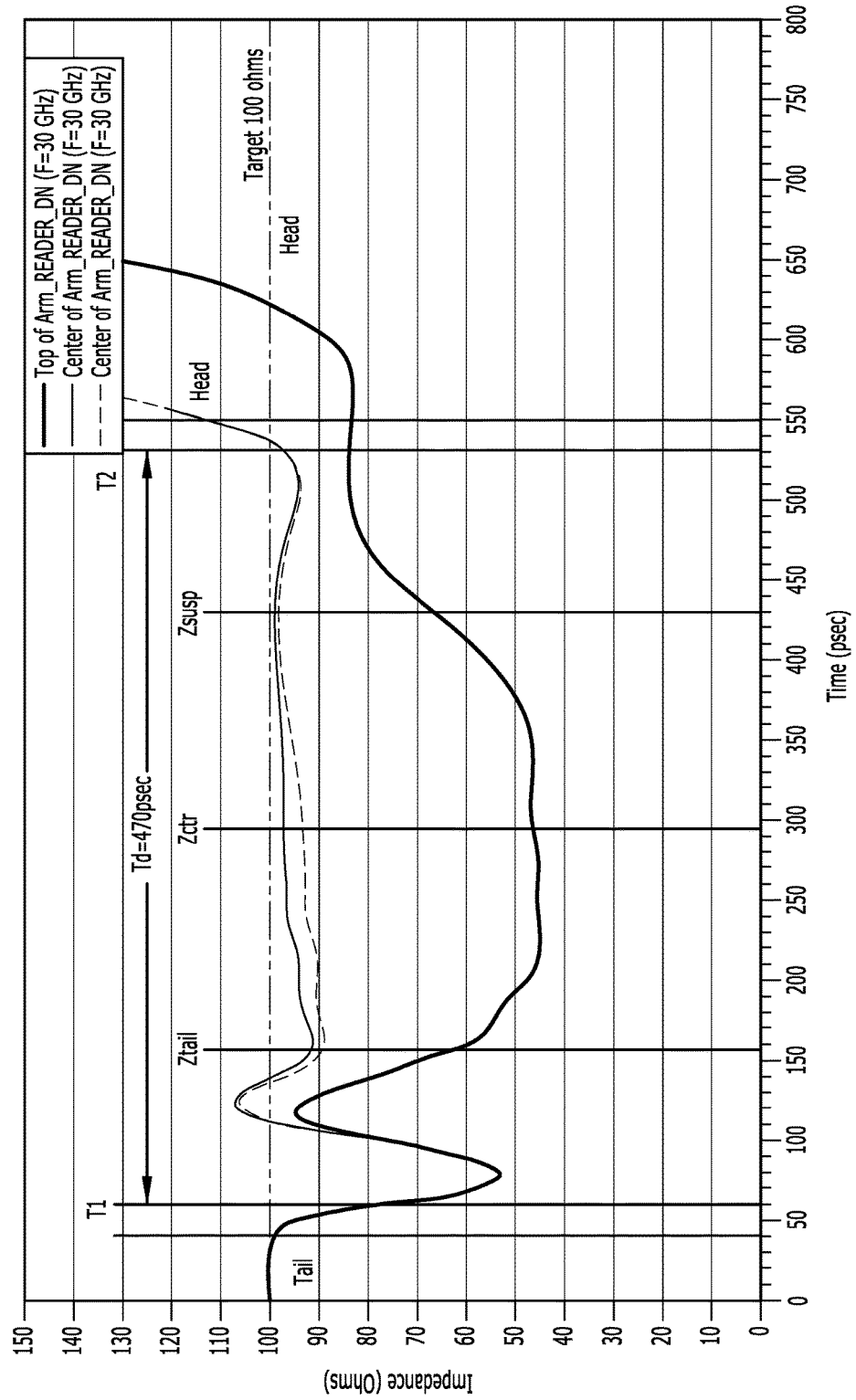
FIG. 9 is a graph showing TDR readings for data read signal traces for the tail being located at different heights within the actuator arm recess, according to a simulation.
Figure 10:
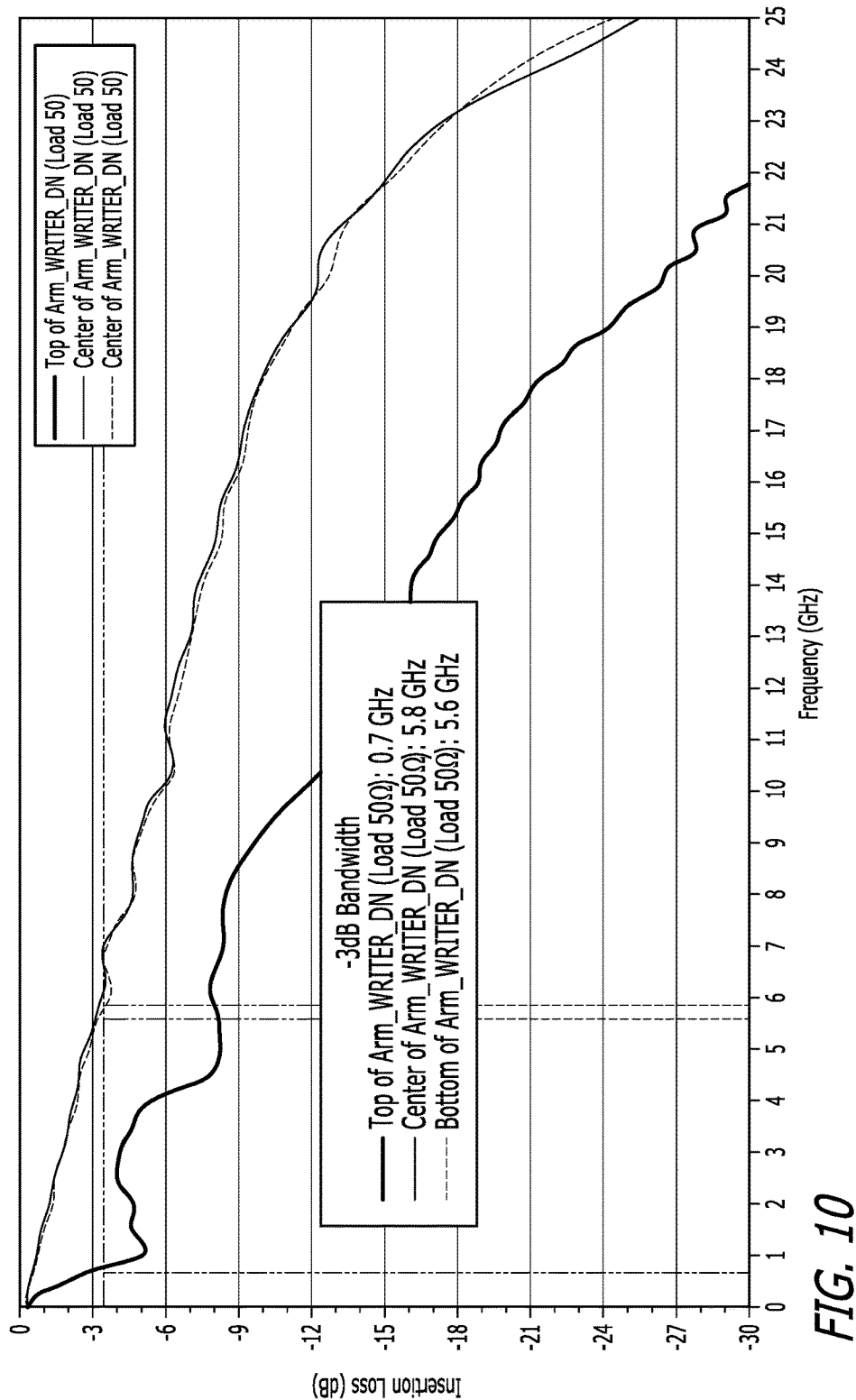
FIG. 10 is a graph of bandwidth of data write signals for the tail being located at different heights within the actuator arm recess, according to a simulation.
Figure 11:
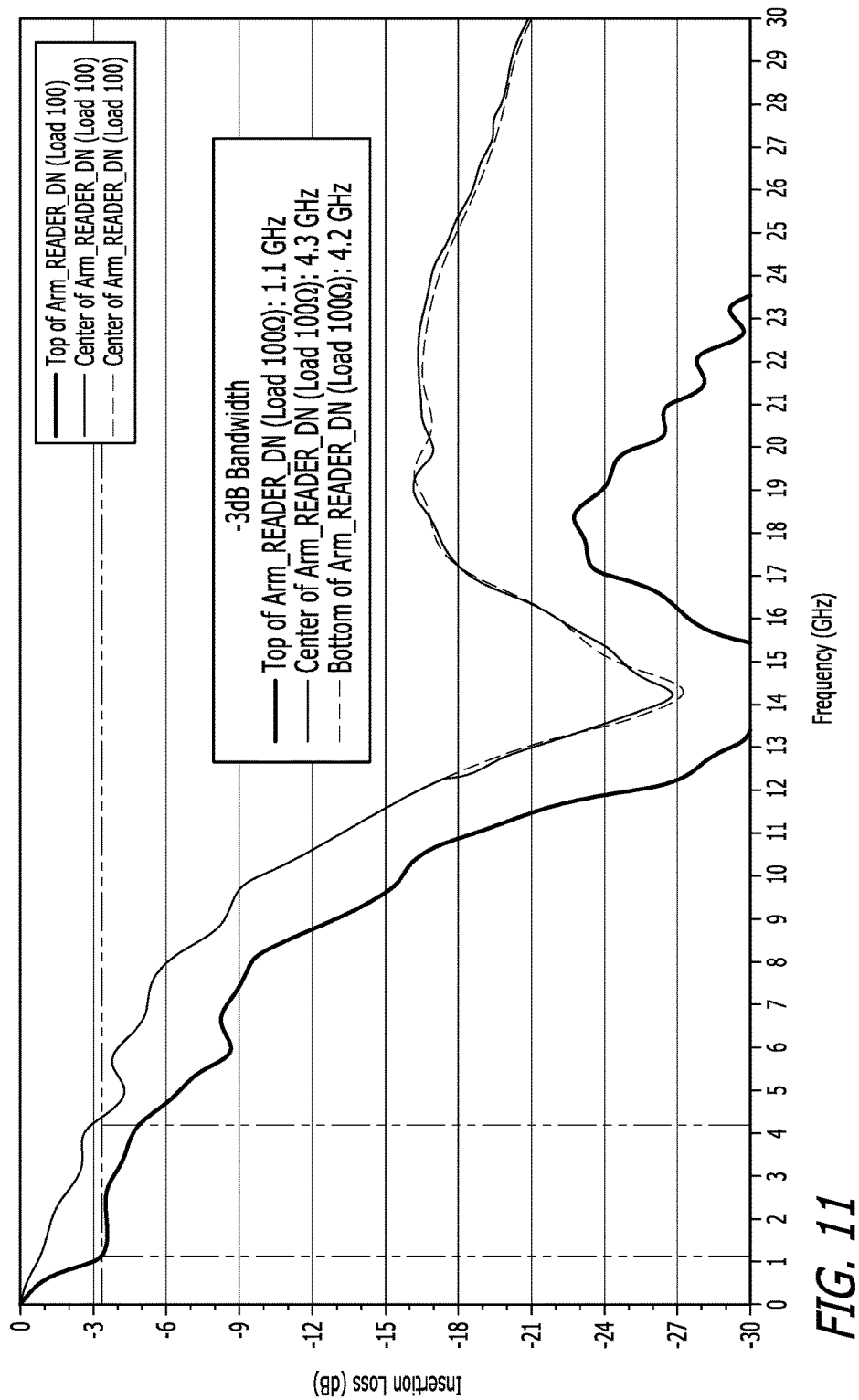
FIG. 11 is a graph of bandwidth of data read signals for the tail being located at different heights within the actuator arm recess, according to a simulation.

FIG. 7 is a cross-section of circuit tail area 41 within the slot 18 in the actuator arm 16 according to a second embodiment of the invention. In this embodiment, spacer 160 takes the form of a thickened portion 149 of the covercoat 148 over the signal traces 47, such that the covercoat is thicker or thickest over the circuit traces in the tail area 41 that gets inserted into the actuator arm recess 18. Preferably the thickened area 149 of covercoat 148 is at least 0.5 mm thick, and more preferably at least 1.0 mm thick. Typical nominal thickness for the covercoat over a suspension circuit is approximately 3-5 µm. The thickness of the thickened portion of coverlayer could be, for example: thicker than the average thickness of the coverlayer along the length of the circuit; thicker than the nominal thickness of the coverlayer along the length of the circuit; thicker than the average thickness of the covercoat in an area that is distal of the actuator arm; thicker than at least one other portion of the flexure tail; thickest within the recess; thickest where it is inserted at least partially into the actuator arm; at least 50% thicker than an average covercoat thickness of the flexible circuit; at least 50% thicker than an average covercoat thickness of the flexible circuit in an area of the flexible circuit that is distal of the actuator arm; the thickest portion of the circuit covercoat; and/or at least 10 times the nominal thickness of the covercoat in the gimbal area of the circuit.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

We claim:

1. A disk drive comprising:
    a disk containing a data storage medium for containing data;
    an actuator arm driven by a motor;
    a suspension having a suspension body, the suspension body having a distal end and a proximal end;
    a read/write head mounted to the distal end of the suspension body;
    a flexible circuit comprising electrical signal traces and an insulating covercoat over the electrical signal traces, the electrical signal traces electrically connected to the read/write head for carrying data signals to and from the read/write head, the insulating covercoat having a covercoat thickness in a generally distal end thereof, the flexible circuit including a flexible circuit tail extending in a proximal direction past the suspension body proximal end;
    a recess within the actuator arm, the recess extending in a generally longitudinal direction along the actuator arm, the recess having electrically conductive top and bottom walls;
    the flexible circuit tail disposed at least partially within the recess to extend in a generally longitudinal direction therein, thereby at least partially shielding the flexible circuit tail from disk wind; and
    a dielectric spacer disposed between the recess top wall and the flexible circuit tail such that no electrically conductive layer is between the dielectric spacer and the recess top wall, the dielectric spacer maintaining the signal traces of the flexible circuit tail separated from the recess top wall by a distance that is greater than the covercoat thickness, the dielectric spacer thus reducing electrical coupling from the signal traces to the actuator arm thereby increasing a data bandwidth of the flexible circuit; and
    adhesive in the recess to secure the flexible circuit tail to the actuator arm.

2. The disk drive of claim 1 wherein the dielectric spacer comprises viscoelastic material.

3. The disk drive of claim 1 wherein both the dielectric spacer and a vibration dampener adhered to the suspension comprise a first viscoelastic material.

4. The disk drive of claim 1 wherein the dielectric spacer has a thickness in the range of 0.5 mm-3.0 mm.

5. The disk drive of claim 1 wherein the dielectric spacer has a thickness of approximately 1 mm.

6. The disk drive of claim 1 wherein the dielectric spacer has a thickness of approximately 2 mm.

7. The disk drive of claim 1 wherein the dielectric spacer comprises a thickened area of the insulating covercoat over the circuit traces where the flexible circuit tail is disposed within the recess.

8. The disk drive of claim 1 wherein the dielectric spacer comprises sheet material having a generally uniform thickness, the sheet material being adhered in solid form to the flexible circuit tail before the flexible circuit tail is inserted into the recess.

9. A disk drive having a flexure tail tucked into a recess within an actuator arm suspension, wherein:
    a dielectric spacer is disposed at least partly within the recess and between the flexure tail and the actuator arm, such that no electrically conductive layer is between the dielectric spacer and a top wall of the recess, and the dielectric spacer and flexure tail are secured to the actuator arm by adhesive in the recess, thereby increasing a distance between signal conductors of the flexure tail and an adjacent wall of the recess thereby reducing electrical coupling between the signal conductors and the actuator arm.

10. The disk drive of claim 9 wherein the dielectric spacer is formed separately from the flexure tail and thereafter adhered to the flexure tail before the flexure tail is inserted into the recess.

11. The disk drive of claim 9 wherein the dielectric spacer comprises a viscoelastic material.

12. The disk drive of claim 9 wherein the flexure tail has an insulating covercoat, and the dielectric spacer comprises a thickened area of said covercoat such that the covercoat is thicker within the recess than in at least one other portion of the flexure tail.

13. The disk drive of claim 12 wherein the covercoat is thickest within the recess.

14. The disk drive of claim 12 wherein the covercoat is thicker within the recess than an average thickness of the covercoat in an area that is distal of the actuator arm.

15. The disk drive of claim 14 wherein:
    the flexure tail forms part of an electrical circuit of the suspension; and
    the covercoat over signal traces within the recess is at least 50% thicker than an average covercoat thickness in an area distal of the actuator arm.

16. A disk drive comprising:
    a data disk; and
    an actuator arm to which a suspension is affixed, the suspension including an electrical circuit and a read/write head for writing data to, and reading data from, the data disk;

wherein:
the actuator arm has a recess therein in which a portion of the electrical circuit is disposed; and
a spacer on the electrical circuit maintains a separation distance of at least 0.5 mm between signal traces of the electrical circuit and a wall of the actuator arm that is adjacent to the signal traces, the spacer configured such that no electrically conductive layer is between the spacer and the wall of the actuator arm that is adjacent to the signal traces; and
adhesive in the recess secures the electrical circuit to the actuator arm.

17. The disk drive of claim 16 wherein the spacer comprises viscoelastic material.

18. The disk drive of claim 16 wherein the spacer comprises a dielectric.

19. The disk drive of claim 16 wherein the spacer is adhered to the circuit by adhesive.

20. The disk drive of claim 16 wherein the electrical circuit has a covercoat material on it, and the spacer comprises a thickened area of covercoat material within the recess.

21. The disk drive of claim 16 wherein the electrical circuit includes a covercoat, and the spacer comprises viscoelastic material on the covercoat.

22. The disk drive of claim 16 wherein the electrical circuit includes a covercoat, and the spacer comprises sheet material adhered to the covercoat.

* * * * *